United States Patent [19]

Overton et al.

[11] Patent Number: 4,538,672

[45] Date of Patent: Sep. 3, 1985

[54] TRACKING TEMPERATURE CONTROLLER APPARATUS

[75] Inventors: Raymond C. Overton; Charles F. Cole, both of Ponca City, Okla.

[73] Assignee: Conoco Inc., Ponca City, Okla.

[21] Appl. No.: 394,675

[22] Filed: Jul. 2, 1982

[51] Int. Cl.³ ............................................. G05D 23/24
[52] U.S. Cl. ........................................ 165/27; 165/30; 236/46 F
[58] Field of Search ................ 165/14, 26, 27, 30; 236/1 C, 46 F; 307/310

[56] References Cited

U.S. PATENT DOCUMENTS

| | | | |
|---|---|---|---|
| 3,149,293 | 9/1964 | Farkas | 236/46 F |
| 3,599,864 | 8/1971 | Liddle | 236/46 F |
| 3,768,545 | 10/1973 | Wills | 165/27 |
| 3,826,305 | 7/1974 | Fishman | 165/30 |
| 3,942,718 | 3/1976 | Palmieri | 165/26 |
| 4,199,023 | 4/1980 | Phillips | 165/26 |
| 4,237,420 | 12/1980 | Ebihara et al. | 307/310 |
| 4,333,519 | 6/1982 | Shafrir et al. | 165/27 |

FOREIGN PATENT DOCUMENTS

| | | | |
|---|---|---|---|
| 706836 | 1/1980 | U.S.S.R. | 165/26 |
| 739494 | 6/1980 | U.S.S.R. | 165/26 |
| 830345 | 5/1981 | U.S.S.R. | 236/46 F |
| 840841 | 6/1981 | U.S.S.R. | 165/30 |

Primary Examiner—Douglas Hart
Attorney, Agent, or Firm—William J. Miller

[57] ABSTRACT

Apparatus for controlling temperature in accordance with a source temperature that includes a clock pulse generating circuit that triggers each of first and second mono-stable multivibrators which provide opposite phase pulse outputs having durations controlled by the R-C time of thermistor sensing components. A retriggerable monostable multivibrator is then controlled in response to pulse duration difference to provide toggle energization of heating and cooling sources.

8 Claims, 2 Drawing Figures

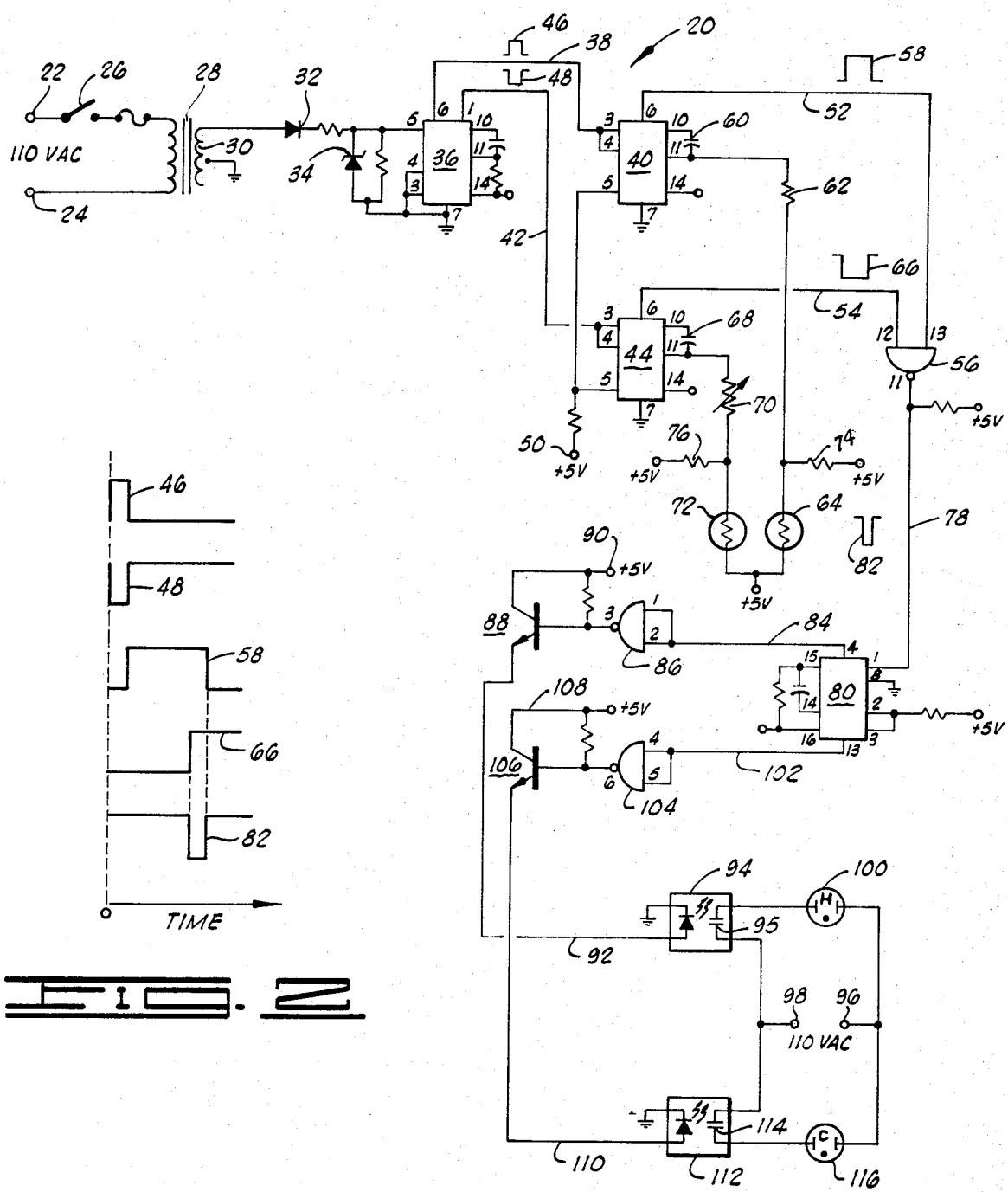

4,538,672

TRACKING TEMPERATURE CONTROLLER APPARATUS

BACKGROUND OF THE INVENTION

1. Field of the Invention

The invention relates generally to temperature control devices and, more particularly, but not by way of limitation, it relates to an improved form of tracking temperature controller for maintaining a first medium at the same temperature as that of another source.

2. Description of the Prior Art

The prior art includes various forms of temperature controller apparatus for utilization to control temperature around a predetermined set point in various types of heating, reaction chambers or vessels and diverse other exothermic processes. U.S. Pat. No. 4,288,854 is of general interest in that it teaches a temperature controller that senses a body temperature and then heats or cools the body in either of a high or low power mode, depending on previous heating and cooling cycle time. Thus, heating power is increased in response to the need for greater heat input to the controlled body. This teaching utilizes specific digital logic and control circuitry functioning in response to detected duty cycle periodicity to generate the required heating and cooling correction inputs to the controlled body. Still other patents of a general nature use programmed digital logic to control any of various parameters, e.g. U.S. Pat. No. 4,209,837, and these teachings function in old and well-known manner, utilizing various combinations of circuit components, to generate an error voltage proportional to a difference between a desired value of a physical parameter and its actual value, thereafter to provide correctional control output. Such prior art circuitry functions along the lines of basic servo control circuitry albeit that they function utilizing more sophisticated digital equipmentation.

Other patents of interest relative to the present invention are as follows: U.S. Pat. No. 4,234,410; U.S. Pat. No. 4,249,907; U.S. Pat. No. 2,310,955; U.S. Pat. No. 3,258,970; and, U.S. Pat. No. 3,761,690.

SUMMARY OF THE INVENTION

The present invention relates to improvements in temperature controllers, particularly those control circuits which are utilized to maintain the temperature of a first body at the temperature of a second body or source. The controller functions to track accurately the temperature changes with control input to vary the temperature of the first body in close relationship. The device utilizes A-C line input which is rectified and clocked out as simultaneous but opposite polarity clock pulses for input to respective first and second mono-stable multivibrators. Each of the respective multivibrators then provides first and second pulses, each having a duration that is controlled in response to instantaneous sensed temperature, and the first and second pulses are applied through a NAND gate to generate an error pulse in the event of differing pulse durations. This presence of pulse difference output is then applied through a retriggerable monostable multivibrator stage to energize a heating element, while the absence of such time difference pulse energizes an alternate cooling system which follows up a heating sequence to correct for heat energy input overrun as control toggles about the set point.

Therefore, it is an object of the present invention to provide a temperature control for a medium that accurately tracks or follows another temperature condition as sensed at another source.

It is also an object of the present invention to provide a temperature controller capable of sensing temperature in a water bath and accurately tracking temperature in a chemical reaction-immersed therein.

It is yet further an object of the present invention to provide a tracking temperature controller that is capable of accurately tracking or following a reaction temperature upward or downward as a chemical process may change.

It is still further an object of the present invention to provide a tracking temperature controller in much simplified yet rugged and reliable circuit construction.

Finally, it is an object of the present invention to provide a tracking temperature controller which requires minimal calibration and initial adjustment but is capable of extremely accurate tracking between the sensed temperature and a controlled temperature.

Other objects and advantages of the present invention will be evident from the following detailed description when read in conjunction with the accompanying drawings which illustrate the invention.

BRIEF DESCRIPTION OF THE DRAWINGS

FIG. 1 is a schematic drawing of the temperature control circuit of the present invention; and FIG. 2 is a graphic illustration of amplitude/time depictions for various key pulses that are generated in the circuitry of FIG. 1.

DETAILED DESCRIPTION OF THE INVENTION

Referring to FIG. 1, a temperature controller 20 is energized with application of a line voltage source at terminals 22 and 24 through off/on switch 26 to a primary power transformer 28. Transformer 28 may be such as a Triad type F-119X as one-half secondary winding 30 is utilized to provide output to a half-wave rectifier consisting of a rectifier 32 and a grounded zener diode 34 that provides voltage regulation. The voltage from rectifier 32 provides a clock frequency input to the circuit as a standard source of low D-C voltage power is provided for energization of the several integrated circuit components.

The clock synch pulses are formed as half-wave pulses at 60 hertz as applied to pin No. 5 of clock pulse generator 36, an integrated circuit type SN74121, a monostable multivibrator. The clock pulse generator 36 provides a pulse HIGH output at a frequency of 60 hertz from pin No. 6 on lead 38 for inputto pins Nos. 3 and 4 of the pulse generator 40, another type SN74121. Simultaneous output of a pulse LOW from clock pulse generator 36 is from pin No. 1 via lead 42 to pins Nos. 3 and 4 of a pulse generator 44, also a type SN74121. The clock pulse outputs on leads 38 and 42 are generated at the clock pulse rate of 60 hertz and the respective simultaneous pulses 46 and 48 (see also FIG. 2) are opposite in polarity.

Each of pulse generators 40 and 44 are energized in like manner with pplication of +5 volts D-C at a terminal 50, and first and second pulse outputs are derived on respective leads 52 and 54 as they are applied in dual input to a NAND gate 56, one gate of a type SN7403 Quad NAND gate circuit. A first pulse on lead 52, depicted as pulse HIGH 58, is output from pin No. 6 of pulse generator 40 on lead 52, and the duration of pulse 58 is a function of the resistance/capacitance time of a capacitor 60 connected between pins Nos. 10 and 11, a resistor 62, and a first or control thermistor 64 connected in series to the +5 volts D-C supply. Thermistor 64 is in contact with the body being sensed, i.e. that temperature which the device is tracking.

In similar manner, pulse generator 44 provides output at pin No. 6 of a pulse LOW depicted as 66. Pulse 66 is of opposite polarity from first output pulse 58 and more often than not it is of a different, i.e. shorter, duration as pulse duration is controlled by the resistance/capacitance time factor of a capacitor 68 connected across pins 10 and 11 of pulse generator 44, and as further connected through a calibration resistor 70 and a follow-up thermistor 72 to the +5 volts D-C supply. The thermistors 64 and 72 are balanced by application of +5 volt D-C to matched resistors 74 and 76 with fine tuning of zero or balance being provided by potentiometer 70.

The first and second pulse outputs on leads 52 and 54 are then applied to NAND gate 56 and, if there is any difference in duration of pulses 58 and 68, a difference pulse LOW output is provided on a lead 78 for input to pin No. 1 of a retriggerable monostable multivibrator 80, a type SN 74123. The difference output pulse, shaped as at 82, see also FIG. 2, has a pulse duration equal to the difference in termination of the pulse duration of each of respective pulses 58 and 66 by virtue of the operation of NAND gate 56. The type SN74123, retriggerable monostable multivibrator is used to minimize noise effects to NAND gates 86 and 104. This allows the SN74123 pulse duration at line 84 to be continuously low as it is retriggered 60 times a second so that noise cannot change its state.

With the presence of any pulse 82 on lead 78, retriggerable monostable multivibrator 80 is triggered ON to go from a HIGH state to a LOW state output from pin No. 4 with pin No. 13 output occuring oppositely as it goes to a HIGH output. Thus triggered LOW output on lead 84 is applied through a NAND gate 86, a section of a type SN7403, which acts as an inverter to energize the base of an NPN transistor 88 to conduction. Thus, transistor 88, a type 2N4922, is connected common-emitter between supply voltage junction 90 and an input lead 92 to a solid state relay 94, a General Electric 25 ampere solid state relay of the opto-coupler type. As transistor 88 conducts to energize relay 94, contacts 95 close to apply 110 volts A-C energizing voltage from source terminals 96 and 98 across a heater element 100 to effect heating of the controlled body or medium.

When retriggerable monostable multivibrator 80 was triggered an output from pin No. 13 on a lead 102 goes HIGH and, as applied through a NAND gate inverter 104 provides a LOW output to the base of an NPN transistor 106, a type 2N4922. Transistor 106 is also connected common-emitter between a power supply junction 108 and an output lead 110 to a solid state relay 112, another opto-coupler. Thus, transistor 106 is held cut-off with retriggerable monostable multivibrator 80 triggered and providing HIGH output on lead 102; however, cessation of pulse duration difference pulses 82 on input lead 78 causes output from pin No. 13 of retriggerable monostable multivibrator 80 to go LOW with a subsequent HIGH output from NAND gate inverter 104 to cause conduction of transistor 106. With conductive output on lead 110, the solid state relay 112 is energized to close contacts 114 thereby to bring cooling element 116 into operation. Various forms of heating element 100 and cooling element 116 may be utilized so long as the various components are responsive to 110 volt A-C energization or other activating power input as may be similarly controlled in application. Thus, the heater element 100 may be any of resistive, forced hot air or the like and the cooling element 116 may also be such as forced air or cold water or other coolant operated by a valve in response to the A-C control input.

In operation, for example a typical up-track operation, a basic clock pulse rate is set up by clock pulse generator 36 to provide clock pulse outputs on leads 38 and 42 to the respective pulse generators 40 and 44, each of which is resistance/capacitance controlled as to pulse duration by a temperature responsive resistance. Thus pulse on lead 38 (pulse 46) triggers the monostable multivibrator or pulse generator 40 to provide output of a pulse 58 on lead 52 having a duration determined by capacitor 60 and the thermistor 64 and the R-C time with which they affect the circuitry of multivibrator 40. In like manner, opposite polarity clock pulse 48 on lead 42 triggers monostable multivibrator or pulse generator 44 to provide a reverse polarity pulse 66 on lead 54 that also has a unique pulse duration as determined by capacitor 68 and the follow-up thermistor 72.

As respective pulses 58 and 66 on leads 52 and 54 are applied to NAND gate 56, a respective duration termination difference pulse 82 is generated for output on lead 78 to trigger the retriggerable monostable multivibrator 80. Of course, in the event that termination of respective positive going and negative going pulses 58 and 66 was simultaneous in time, there would be no output from NAND gate 56 and retriggerable monostable multivibrator 80 would not be triggered. When retriggerable monostable multivibrator 80 is triggered by the pulse duration difference pulse, output on lead 84 through NAND gate 86 and transistor 88 energizes the solid state relay 94 to apply power across heating element 100 for that duration. This may occur repeatedly at the 60 hertz clock rate. However, when there is no pulse duration difference output on lead 78, such as a pulse 82, retriggerable monostable multivibrator 80 is not energized and output on lead 102 through NAND gate 104 and transistor 106 energizes an alternate solid state relay 112 which applies power across a cooling element 116. In this manner, the alternate heating and cooling controls toggle about the controller set point or that temperature being sensed by the thermistors 64 and 72. After each sequence of heating and cessation of termination difference pulses 82, the cooling function will be energized through solid state relay 112 and cooling element 116.

The foregoing discloses a novel form of tracking temperature control which enables highly accurate tracking with minimum hunting and over-shoot. The apparatus of the present invention will handle both heating and cooling control within ±0.4° at 80° centigrade with the use of matched thermistors in a well insulated system. Thus, the controller is particularly valuable in applications wherein it is used to track or follow reaction temperature up or down as a chemical process proceeds through its reaction. The temperature controller of the present invention is relatively simple of construction, yet highly reliable and accurate in operation.

Changes may be made in combination and arrangement of elements as heretofore set forth in the specification and shown in the drawings; it being understood that changes may be made in the embodiments disclosed with departing from the spirit and scope of the invention as defined in the following claims.

What is claimed is:

1. Temperature control apparatus, comprising:
   clock means generating first and second clock pulses simultaneously in opposite polarity;
   first means including a first thermistor, triggered by said first clock pulse and generating a first pulse output with duration controlled by said first thermistor;
   second means including a second thermistor, triggered by said second clock pulse and generating a second pulse output with duration controlled by said second thermistor;
   gate means receiving input of said first and second pulse outputs to generate a control pulse output having a duration equal to any difference between terminations of said first and second pulses;
   control means energized by said control pulse output to generate a heating pulse output for the duration, and de-energized to generate an alternate cooling pulse when there is no control pulse output; and
   heating and cooling means responsive respectively to said heating and cooling pulse outputs.

2. Apparatus as set forth in claim 1 wherein said clock means comprises:
   a source of alternating voltage; and
   multivibrator means triggered by said source to generate said first and second clock pulses in opposite polarity.

3. Apparatus as set forth in claim 2 wherein said source comprises:
   a source of A-C line voltage; and
   rectifier means receiving said line voltage and producing a trigger output to said multivibrator means.

4. Apparatus as set forth in claim 1 wherein each of said first and second means comprises:
   a monostable multivibrator having said respective pulse duration controlled by said thermistor in combination with a capacitor.

5. Apparatus as set forth in claim 2 wherein:
   said first means generates a first pulse output; and
   said second means generates a second pulse output of opposite polarity.

6. Apparatus as set forth in claim 5 wherein said gate means comprises:
   NAND gate means receiving input of said first and second outputs in opposite polarity and providing an inverted output control pulse having said duration equal to pulse termination difference.

7. Apparatus as set forth in claim 1 wherein said control means comprises:
   retriggerable monostable multivibrator means normally producing a heating pulse HIGH and a cooling pulse LOW and energized by said control pulse output to provide a heating pulse LOW and a cooling pulse HIGH;
   first relay means connected to energize said heating means; and
   first reactance means rendered conductive in response to said heating pulse LOW input to actuate said first relay means and energize said heating means.

8. Apparatus as set forth in claim 7 wherein said control means further comprises:
   second relay means connected to energize said cooling means; and
   second reactance means rendered conductive in response to said cooling pulse LOW input to actuate said second relay means and energize said cooling means.

* * * * *